United States Patent
Ho et al.

(10) Patent No.: US 11,206,568 B2
(45) Date of Patent: Dec. 21, 2021

(54) ROUTER AND ROUTING METHOD

(71) Applicant: REALTEK SEMICONDUCTOR CORPORATION, Hsinchu (TW)

(72) Inventors: Tsung Jen Ho, Hsinchu (TW); Chung Chang Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 120 days.

(21) Appl. No.: 16/745,017

(22) Filed: Jan. 16, 2020

(65) Prior Publication Data

US 2021/0092633 A1    Mar. 25, 2021

(30) Foreign Application Priority Data

Sep. 19, 2019  (TW) ................................. 108133846
Oct. 28, 2019  (TW) ................................. 108138877

(51) Int. Cl.
*H04W 28/02*    (2009.01)
*H04L 12/801*   (2013.01)
*H04L 12/879*   (2013.01)

(52) U.S. Cl.
CPC ......... *H04W 28/0215* (2013.01); *H04L 47/35* (2013.01); *H04L 49/901* (2013.01)

(58) Field of Classification Search
CPC .......... H04W 28/0215; H04W 28/0289; H04L 47/14; H04L 47/35; H04L 49/25; H04L 49/901

See application file for complete search history.

(56) References Cited

U.S. PATENT DOCUMENTS

| | | | | |
|---|---|---|---|---|
| 6,993,032 B1* | 1/2006 | Dammann | ............ | H04L 47/527 370/395.7 |
| 7,120,117 B1* | 10/2006 | Liu | ........................ | H04L 49/253 370/236 |
| 7,221,678 B1* | 5/2007 | Hughes | ................ | H04L 47/6285 370/401 |
| 7,911,960 B1* | 3/2011 | Aydemir | ................ | H04L 47/266 370/236 |
| 9,641,465 B1* | 5/2017 | Gabbay | .................. | H04L 49/901 |
| 11,005,778 B1* | 5/2021 | Yonai | ....................... | H04L 47/30 |
| 2003/0016628 A1 | 1/2003 | Kadambi et al. | | |
| 2005/0013251 A1* | 1/2005 | Wang | ........................ | H04L 47/17 370/235 |
| 2005/0259574 A1* | 11/2005 | Figueira | .................. | H04L 49/30 370/229 |
| 2006/0092845 A1* | 5/2006 | Kwan | ...................... | H04L 47/50 370/235 |

(Continued)

FOREIGN PATENT DOCUMENTS

WO   WO 2016086385 A1   6/2016

*Primary Examiner* — Chi H Pham
*Assistant Examiner* — Vladislav Y Agureyev
(74) *Attorney, Agent, or Firm* — WPAT, P.C., Intellectual Property Attorneys; Anthony King

(57) ABSTRACT

The application discloses a router coupled to a first device and a second device. The router includes a first packet input interface, a second packet input interface, a first register, a second register, a control circuit and a switch module. The switch module includes a control port, a first packet output interface and a second packet output interface. The application further discloses a routing method. The router and routing method saves idle time and improves quality of service.

18 Claims, 5 Drawing Sheets

(56) References Cited

U.S. PATENT DOCUMENTS

| | | | |
|---|---|---|---|
| 2007/0047535 A1* | 3/2007 | Varma | H04L 47/30 370/360 |
| 2009/0303876 A1* | 12/2009 | Wu | H04L 47/62 370/230.1 |
| 2013/0028256 A1* | 1/2013 | Koren | H04L 49/3018 370/392 |
| 2013/0250760 A1* | 9/2013 | Sela | H04L 12/413 370/231 |
| 2013/0250762 A1* | 9/2013 | Assarpour | H04L 47/30 370/235 |
| 2014/0016472 A1* | 1/2014 | Porat | H04W 28/0231 370/235 |
| 2014/0161135 A1* | 6/2014 | Acharya | H04L 47/6255 370/412 |
| 2014/0192819 A1* | 7/2014 | Nishimura | H04L 47/621 370/412 |
| 2015/0263994 A1* | 9/2015 | Haramaty | H04L 47/283 370/412 |
| 2016/0248675 A1* | 8/2016 | Zheng | H04L 47/11 |
| 2020/0044976 A1* | 2/2020 | Chang | H04L 49/90 |
| 2020/0287833 A1* | 9/2020 | Bottorff | H04L 45/7453 |

\* cited by examiner

ROUTER AND ROUTING METHOD

CROSS REFERENCE TO RELATED APPLICATIONS

This application claims priority to Taiwan Application Serial Number 108133846, filed on Sep. 19, 2019, and Taiwan Application Serial Number 108138877, filed on Oct. 28, 2019, which are herein incorporated by reference.

BACKGROUND

Field of the Invention

The present disclosure relates to a router and a routing method; in particular, to a router and a routing method that uses a register for flow control.

Description of Related Art

The application of routers includes connecting a local area network with other wireless devices via a wireless network; as the wireless network gets faster and faster, the downlink packets from other wireless devices to the local area network are more and more susceptible to congestion. Once there is congestion, the downlink packets of all network devices connected to the router may experience congestion jointly, thereby jeopardizing the performance of the whole router.

In view of the foregoing, means of improving the flow control to improve quality of service of the router has become a main issue of the related field.

BRIEF SUMMARY OF THE INVENTION

Certain embodiments of the present disclosure provide a router, which is coupled to a first device and a second device, and the router includes: a first packet input interface; a second packet input interface; a first register, configured to temporarily store a plurality of packets from the first packet input interface; a second register, configured to temporarily store a plurality of packets from the second packet input interface; a control circuit, configured to selectively read the first register or the second register to generate a plurality of packets corresponding to the first register or the second register; and a switch module, including: a first packet output interface, coupled to the first device; a second packet output interface, coupled to the second device; and a control port, configured to receive the plurality of packets generated by the control circuit to allow the switch module to accordingly generate a plurality of output packets corresponding to the first register or the second register to the first packet output interface or the second packet output interface; wherein, when the switch module generates the plurality of output packets corresponding to the first register to the first packet output interface according to the plurality of packets generated by the control circuit, and the control port receives a flow control signal for pausing transmission from the first packet input interface, the control port generates a register pause signal to the control circuit, so as to instruct the control circuit to pause reading the first register.

Certain embodiments of the present disclosure provide a routing method, which is configured to couple a first packet input interface or a second packet input interface to a first device and a second device through a first packet output interface and a second packet output interface. The routing method includes: temporarily storing a plurality of packets from the first packet input interface in a first register; temporarily storing a plurality of packets from the second packet input interface in a second register; selectively reading the first register or the second register to generate a plurality of packets corresponding to the first register or the second register; receiving the plurality of packets and generating a plurality of output packets to the first packet output interface or the second packet output interface corresponding to the first register or the second register; and when generating the plurality of output packets corresponding to the first register to the first packet output interface according to the plurality of packets generated, and receiving a flow control signal for pausing transmission from the first packet input interface, generating a register pause signal to pause reading the first register.

The router and routing method according to the present disclosure can decrease the idle time and improve quality of service.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
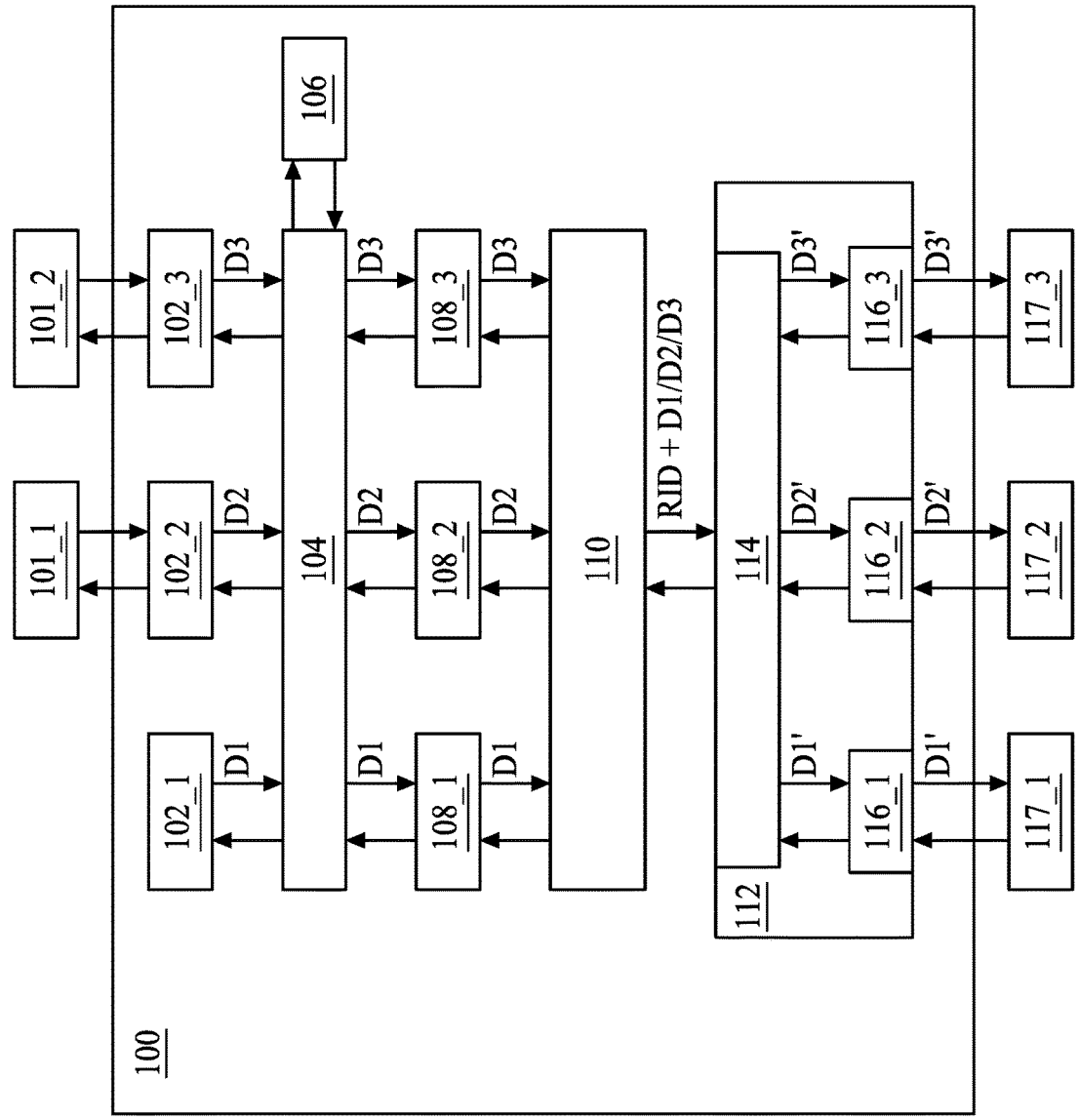
FIG. 1 is a schematic diagram illustrating a router according to the first embodiment of the present disclosure.

FIG. 1 is a schematic diagram illustrating a router according to the first embodiment of the present disclosure. As shown in FIG. 1, the router 100 includes a plurality of packet input interfaces 102_1~102_3 and a plurality of packet output interfaces 116_1~116_3. In the present embodiment, the packet input interface 102_1 includes a processor, configured to designate a plurality of packets D1 to be transmitted to the packet output interface 116_1 via a bus 104. The device 1011 and device 101_2 are respectively coupled to the packet input interface 1022 and packet input interface 102_3 through a wireless network; that is, the packet input interface 102_2 and packet input interface 102_3 are wireless network interfaces, such as those including a wireless network receiver; the device 117_1, device 117_2 and device 117_3 are respectively coupled to the packet output interface 116_1, packet output interface 116_2 and packet output interface 116_3 through a wired network; that is, the packet output interface 116_1, packet output interface 116_2 and packet output interface 116_3 are wired interfaces, such as those including a wired network receiver.

Specifically, the packet input interface 102_2 of the router 100 transmits a plurality of packets D2 from the device 101_1 to the packet output interface 116_2 via the bus 104, or the packet input interface 102_2 may temporarily store a plurality of packets D2 in a memory 106, and then transmit the same to the packet output interface 116_2 via the bus 104. The packet input interface 102_3 of the router 100 transmits a plurality of packets from the device 101_2 to the packet output interface 116_3 via the bus 104, or the packet input interface 102_3 may temporarily store a plurality of packets D3 in memory 106, and then transmit the same to the packet output interface 116_3 via the bus 104.

It should be noted that the present disclosure is not limited to any particular number or interface type of the packet input interfaces 102_1~102_3 and packet output interfaces 116_1~116_3; for example, the packet input interfaces 102_1~102_3 may be arbitrarily substituted with processors, wireless network interfaces, wired network interfaces, or other input/output interfaces; the packet output interfaces 116_1~116_3 may be arbitrarily substituted with wireless network interfaces, wired network interfaces or other input/output interfaces.

The plurality of packets D1, D2 and D3 are temporarily stored in the registers 108_1, 108_2 and 1083 through the bus 104, respectively; in the present embodiment, the registers 108_1, 108_2 and 108_3 are first-in-first-out memories. The control circuit 110 selectively reads the registers 108_1, 108_2 or 108_3, and transmits a register information RID along with the plurality of packets D1, D2 or D3 read out from the registers 108_1, 108_2 or 108_3 to the control port 114. The register information RID is configured to instruct that the plurality of packets D1, D2 or D3 come from which of the registers 108_1, 108_2 or 108_3. The plurality of packets D1, D2 or D3 enter the control port 114 of the switch module 112, and the switch module 112 generates a plurality of output packets D1', D2' or D3' corresponding to registers 108_1, 108_2 or 108_3 according to the plurality of packets D1, D2 or D3, and determines the transmission of the plurality of output packets D1', D2' or D3' to which of the packet output interfaces 116_1~116_3 according to contents of the plurality of packets D1, D2 or D3.

Figure 2:
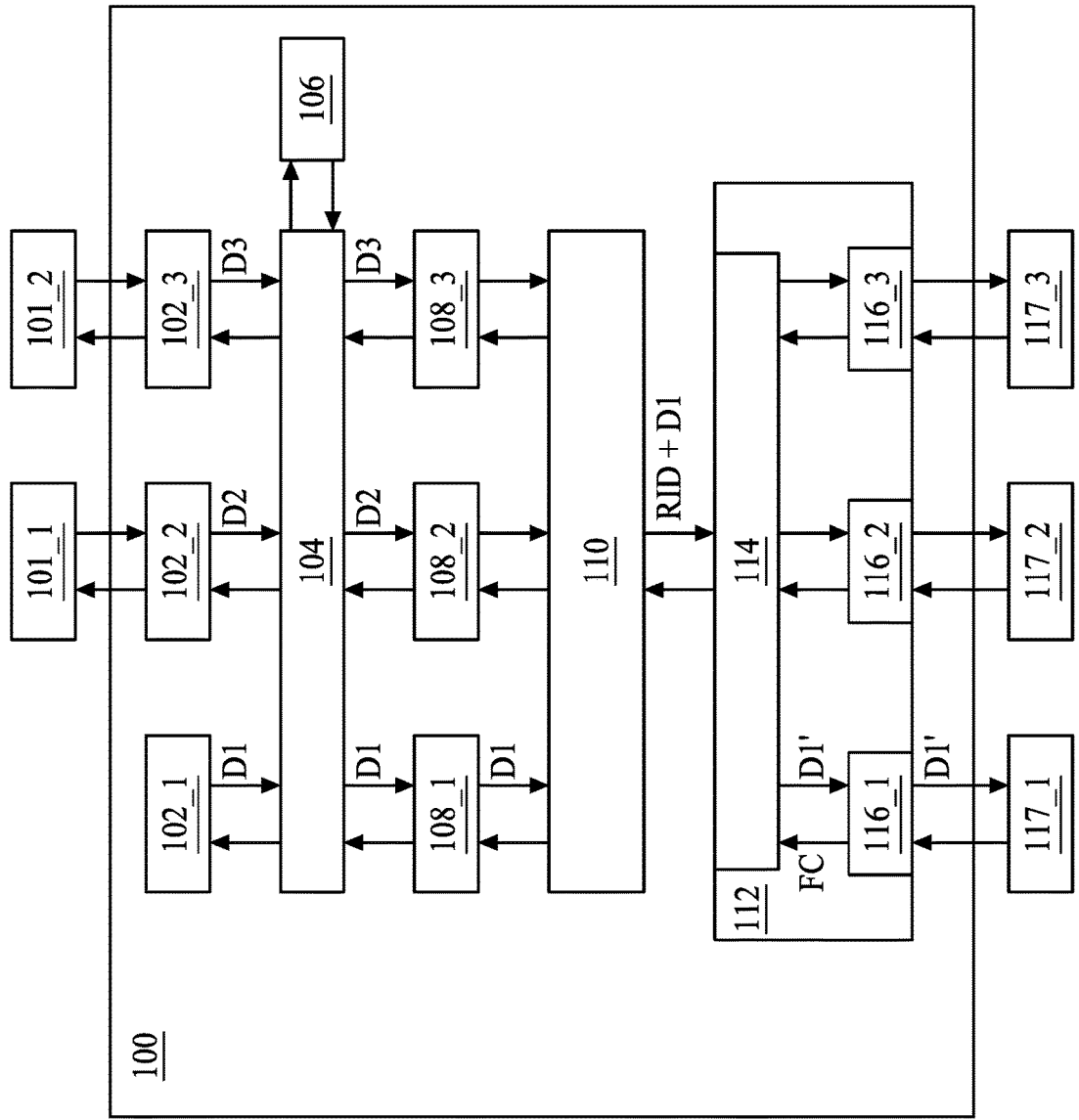
FIG. 2 to FIG. 4 are schematic diagrams illustrating an embodiment of the routing method of the router according to FIG. 1.
Figure 3:
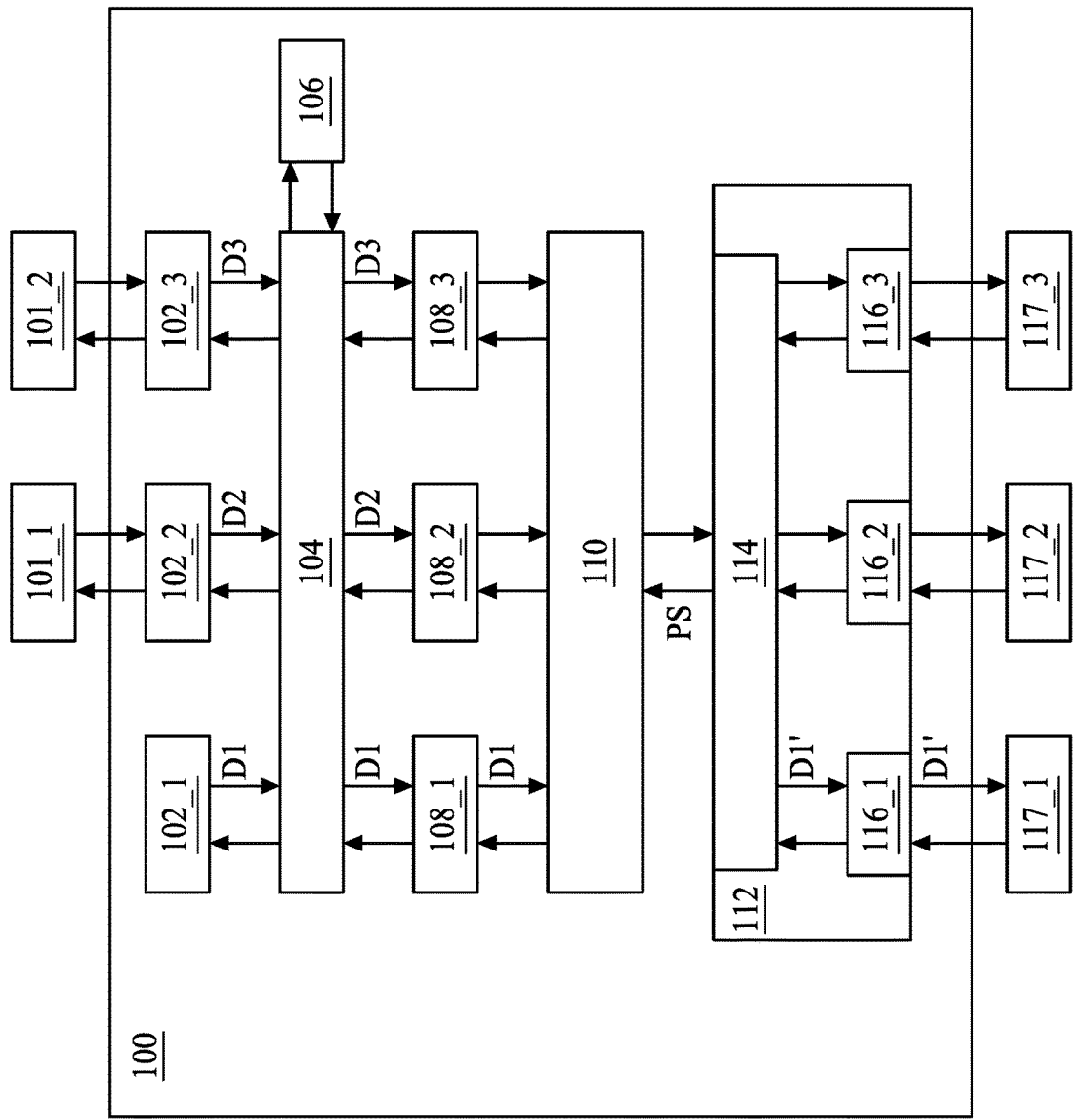
Figure 4:
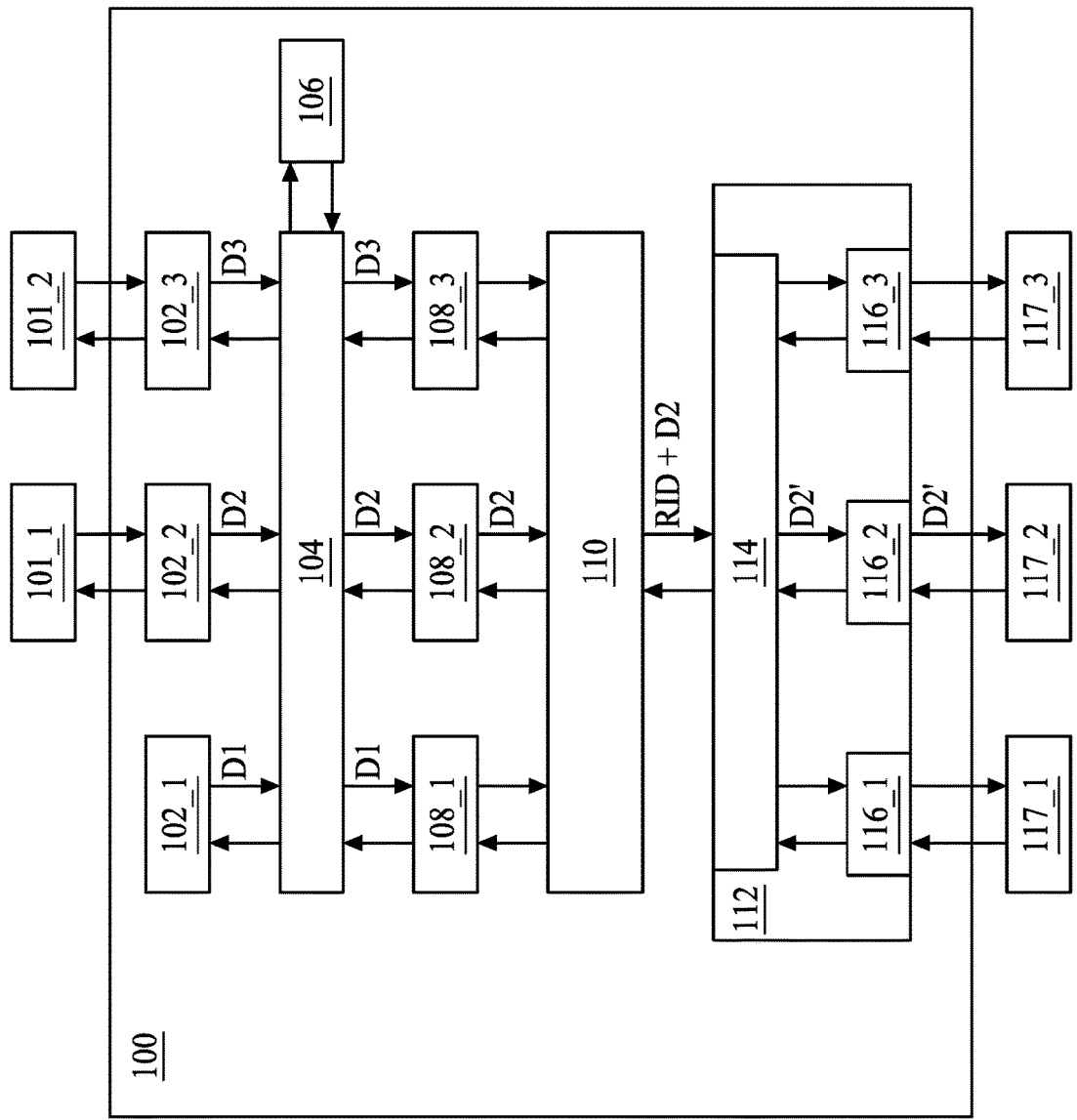

FIG. 2 to FIG. 4 are schematic diagrams illustrating an embodiment of the routing method of the router according to FIG. 1. As shown in FIG. 2, the plurality of packets D1, D2 and D3 are temporarily stored in registers 108_1, 108_2 and 108_3 respectively via the bus 104; in the present embodiment, the control circuit 110 chooses to read the register 108_1, and generate the register information RID corresponding to the register 1081. The switch module 112 generates a plurality of output packets D1' corresponding to register 108_1 to the packet output interface 116_1 according to the plurality of packets D1 and transmits the same to the device 117_1. When the switch module 112 or the device 117_1 wants to pause receiving the plurality of output packets D1', the switch module 112 or the device 117_1 feeds a flow control signal FC back to the control port 114 to pause transmission from the control port 114 to the packet output interface 116_1. Next, as shown in FIG. 3, after the control port 114 receives a flow control signal FC, the control port 114 generates a register pause signal PS to the control circuit 110 according to the register information RID, so as to instruct the control circuit 110 to pause reading the register 108_1.

After the control circuit 110 receives the register pause signal PS, it knows that the packet output interface 116_1 has to pause the receipt of the plurality of packets D1 from the register 108_1, and the control circuits 110 may determine the next action according to a predetermined priority rule. For example, the control circuit 110 may choose to read a register having the highest priority other than the register 108_1; or the control circuit 110 may choose to read any one register other than the register 108_1 randomly; or the control circuit may choose to not read a register other than the register 108_1 until the plurality of packets D1 in the register 108_1 have been transmitted. FIG. 4 is a schematic diagram in which the control circuit 110 determines to read the register 108_2.

As could be seen from the routing method illustrated in FIG. 2 to FIG. 4, since there is only one channel between the control circuit 110 and the switch module 112, but there are a plurality of packets output interfaces 116_1~116_3 in the switch module 112, although the router 100 stops outputting the output packet D1' to the packet output interface 116_1 from the transmit control port after it receives the flow control signal FC, it can in fact relinquish the only channel between the control circuit 110 and the switch module 112 to other packet output interfaces 116_2 or 116_3 by using the control circuit 110 to control the individual flow of registers 108_1~108_3, thereby reducing the idle time and hence, increasing quality of service of the router 100.

Figure 5:
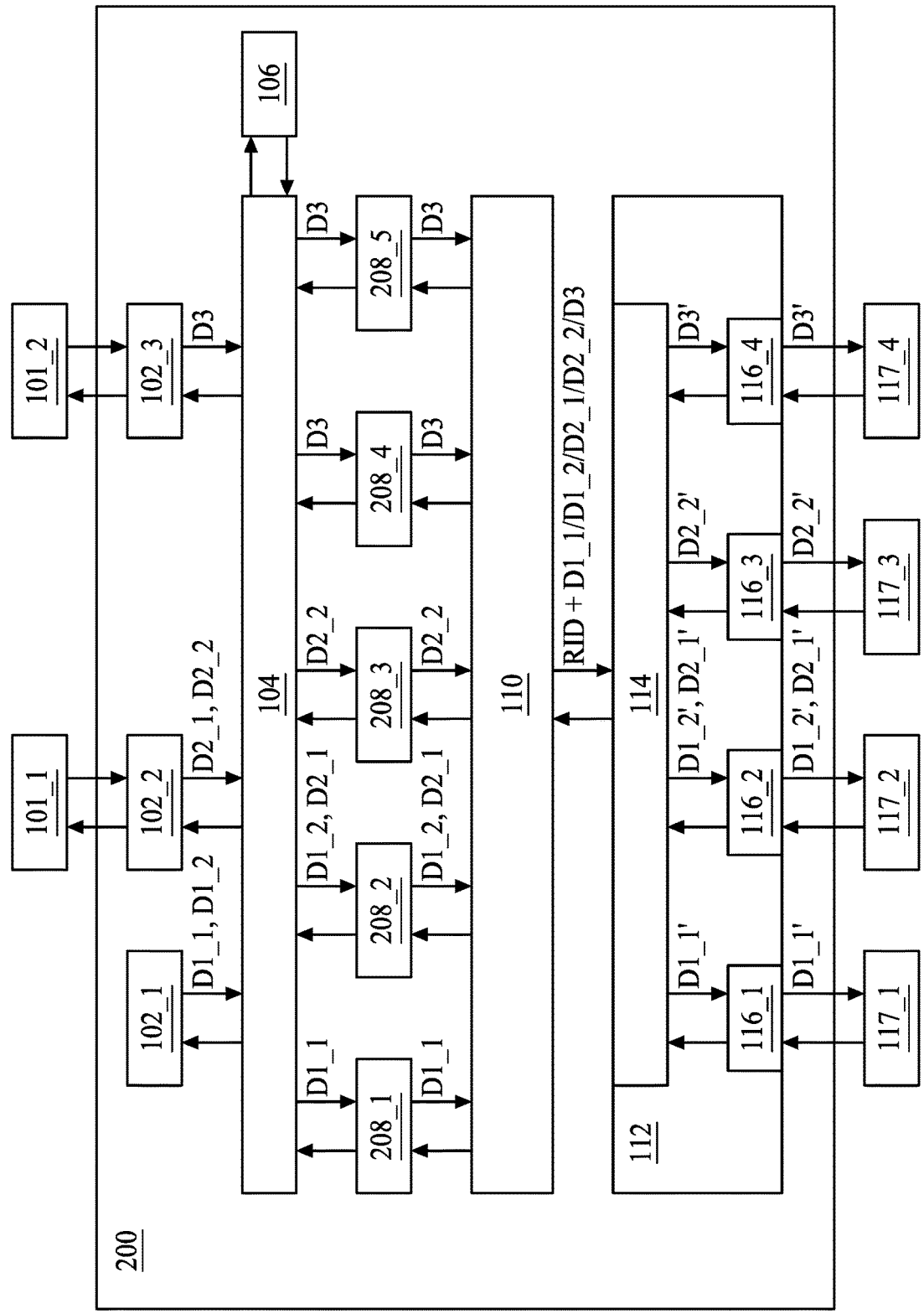
FIG. 5 is a schematic diagram illustrating a router according to the second embodiment of the present disclosure.

In some embodiment, the arrangement of registers 108_1~108_3 of the router 100 in FIG. 1 may be modified. FIG. 5 is a schematic diagram illustrating a router according to a second embodiment of the present disclosure. The router 200 in FIG. 5 differs from the router 100 in that the arrangement of registers 208_1~208_5 in the router 200 differ from the arrangement of register 108_1~108_3 in router 100, and for illustrative purposes, the router 200 has one more packet output interface 116_4 corresponding to the registers 208_1~208_5.

The register 208_1 is configured to temporarily store a plurality of packets D1_1 having a first type from packet input interface 102_1; the register 208_2 is configured to temporarily store a plurality of packets D1_2 having a second type from the packet input interface 102_1 and a plurality of packets D2_1 having the second type from the packet input interface 102_2; the register 208_3 is configured to temporarily store a plurality of packets D2_2 having a third type from the packet input interface 102_2; the register 208_4 and register 208_5 are both configured to temporarily store a plurality of packets D3 from the packet input interface 102_3. In this case, the first type, the second type and the third type are different from each other.

Specifically, registers 208_1~208_3 temporarily store packets according to the types of the packet. Therefore, the predetermined priority rule can be set depending on the different characteristics of the packets of the first type, the second type and the third type, thereby further improving quality of service. On the other hand, the registers 208_4~208_5 are jointly configured to temporarily store packets from the packet input interface 102_3; that is, a packet input interface may be used in connection with more than one register.

The packet output interfaces corresponding to registers 208_1~208_5 may be partially/completely different; for example, in the present embodiment, a plurality of packets D1_1 in the register 208_1 correspond to the output packet D1_1' and are transmitted to the packet output interface 116_1; a plurality of packets D1_2 and D2_1 in the register 208_2 correspond to the output packets D1_2' and D2_1' and are transmitted to the packet output interface 116_2; a plurality of packets D2_2 in the register 208_3 correspond to the output packet D2_2' and are transmitted to the packet output interface 116_3; both of a plurality of packets D3 in the register 208_4 and register 208_5 correspond to the output packet D3' and are transmitted to the packet output interface 116_4.

The other portion of the router 200 is substantially the same as that of the router 100; that is, the routing method of the router 200 is substantially the same as the routing method of the router 100 other than the variation with respect to the correspondence between the register 208_1~208_5 and the packet output interfaces 116_1~116_4.

The router 100/200 according to the present disclosure may control the flow of individual registers 108_1~108_3/208_1~208_5, which differs from the prior art in which the readings of all registers are paused when the packet output interface is congested.

The present invention may be implemented using any appropriate means, including hardware, software, firmware, or a combination thereof. Optionally, at least a portion of the present invention may be implemented as computer software operated in one or more data processors and/or digital signal processors or programmable module components (e.g., a field-programmable gate array (FPGA)).

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A router, coupled to a first device and a second device, the router comprising:
   a first packet input interface;
   a second packet input interface;
   a first register, configured to temporarily store a plurality of packets from the first packet input interface;
   a second register, configured to temporarily store a plurality of packets from the second packet input interface;
   a control circuit, configured to selectively read the first register or the second register to generate a plurality of packets corresponding to the first register or the second register; and
   a switch module, including:
      a first packet output interface, coupled to the first device;
      a second packet output interface, coupled to the second device; and
      a control port, configured to receive the plurality of packets generated by the control circuit to allow the switch module to accordingly generate a plurality of output packets corresponding to the first register or the second register to the first packet output interface or the second packet output interface;
   wherein, when the switch module generates the plurality of output packets corresponding to the first register to the first packet output interface according to the plurality of packets generated by the control circuit, and the control port receives a flow control signal for pausing transmission from the first packet input interface, the control port generates a register pause signal to the control circuit, so as to instruct the control circuit to pause reading the first register; and
   wherein there is only one channel between the control circuit and the switch module, and when the control circuit pauses reading the first register according to the register pause signal, the control circuit starts to read the second register.

2. The router of claim 1, wherein the control circuit transmits a register information along with the plurality of packets read from the first register or the second register to the control port, wherein the register information is configured to indicate that the plurality of packets read from the first register or the second register come from which of the first register or the second register.

3. The router of claim 2, wherein the control port determines to transmit the plurality of output packets to the first packet output interface or the second packet output interface according to contents of the plurality of packets.

4. The router of claim 1, wherein the flow control signal is fed back to the control port by the switch module or the first device to pause the transmission from the first packet input interface.

5. A router, coupled to a first device and a second device, the router comprising:
   a first packet input interface;
   a second packet input interface;
   a third packet input interface;
   a first register, configured to temporarily store a plurality of packets from the first packet input interface;
   a second register, configured to temporarily store a plurality of packets from the second packet input interface;
   a third register, configured to temporarily store a plurality of packets from the third packet input interface;
   a control circuit, configured to selectively read the first register or the second register to generate a plurality of packets corresponding to the first register or the second register; and
   a switch module, including:
      a first packet output interface, coupled to the first device;
      a second packet output interface, coupled to the second device; and
      a control port, configured to receive the plurality of packets generated by the control circuit to allow the switch module to accordingly generate a plurality of output packets corresponding to the first register or the second register to the first packet output interface or the second packet output interface;
   wherein, when the switch module generates the plurality of output packets corresponding to the first register to the first packet output interface according to the plurality of packets generated by the control circuit, and the control port receives a flow control signal for pausing transmission from the first packet input interface, the control port generates a register pause signal to the control circuit, so as to instruct the control circuit to pause reading the first register; and
   wherein the control circuit is further configured to selectively read the first register, the second register or the third register to generate the plurality of packets corresponding to the first register, the second register or the third register, and when the control circuit pauses reading the first register according to the register pause signal, the control circuit determines whether to read the second register or the third register according to a predetermined priority rule.

6. The router of claim 1, further comprising:
   a fourth register, configured to temporarily store the plurality of packets from the first packet input interface;
   wherein the plurality of packets from the first packet input interface that are temporarily stored in the first register have a first type, and the plurality of packets from the first packet input interface that are temporarily stored in the fourth register have a second type, wherein the second type differs from the first type.

7. The router of claim 6, wherein the fourth register is further configured to temporarily store the plurality of packets from the second packet input interface, wherein the plurality of packets from the second packet input interface that are temporarily stored in the second register have a third type, and the plurality of packets from the second packet input interface that are temporarily stored in the fourth register have the second type, wherein the third type differs from the first type.

8. The router of claim 1, wherein the first packet input interface or the second packet input interface is a wireless network interface.

9. The router of claim 1, wherein the first packet output interface or the second packet output interface is a wired network interface.

10. A routing method, configured to couple a first packet input interface, a second packet input interface, or a third packet input interface to a first device, a second device, or a third device through a first packet output interface, a second packet output interface, or a third packet output interface, the routing method comprising:
  temporarily storing a plurality of packets from the first packet input interface in a first register;
  temporarily storing a plurality of packets from the second packet input interface in a second register;
  temporarily storing a plurality of packets from the third packet input interface in a third register;
  selectively reading the first register, the second register, or the third register so as to generate a plurality of packets corresponding to the first register, the second register, or the third register;
  receiving the plurality of packets and generating a plurality of output packets to the first packet output interface or the second packet output interface corresponding to the first register or the second register; and
  when generating the plurality of output packets corresponding to the first register to the first packet output interface according to the plurality of packets generated, and receiving a flow control signal for pausing transmission from the first packet input interface, generating a register pause signal to pause reading the first register; and
  when pausing reading the first register according to the register pause signal, determining whether to read the second register or the third register according to a predetermined priority rule.

11. The routing method of claim 10, wherein, the step of selectively reading the first register or the second register to generate the plurality of packets corresponding to the first register or the second register comprises:
  generating a register information, wherein the register information is configured to indicate that the plurality of packets read from the first register or the second register come from which of the first register or the second register.

12. The routing method of claim 11, wherein, the step of generating the plurality of output packets corresponding to the first register or the second register to the first packet output interface or the second packet output interface according to the plurality of packets comprises:
  determining to transmit the plurality of output packets to the first packet output interface or the second packet output interface according to contents of the plurality of packets.

13. The routing method of claim 10, further comprising:
  feeding back the flow control signal to pause the transmission from the first packet input interface.

14. The routing method of claim 10, comprising: starting to read the second register when pausing reading the first register according to the register pause signal.

15. The routing method of claim 10, further comprising:
  temporarily storing the plurality of packets from the first packet input interface in a fourth register;
  wherein the plurality of packets from the first packet input interface that are temporarily stored in the first register have a first type, and the plurality of packets from the first packet input interface that are temporarily stored in the fourth register have a second type, wherein the second type differs from the first type.

16. The routing method of claim 15, further comprising:
  temporarily storing the plurality of packets from the second packet input interface in the fourth register, wherein the plurality of packets from the second packet input interface that are temporarily stored in the second register have a third type, and the plurality of packets from the second packet input interface that are temporarily stored in the fourth register have the second type, wherein the third type differs from the first type.

17. The routing method of claim 10, wherein the first packet input interface or the second packet input interface is a wireless network interface.

18. The routing method of claim 10, wherein the first packet output interface or the second packet output interface is a wired network interface.

* * * * *